United States Patent [19]

Rizio

[11] 4,030,324

[45] June 21, 9177

[54] LOCK HARDWARE FOR OUTBOARD MOTOR

[76] Inventor: Leo A. Rizio, 260 1/2 Grand Ave., San Jose, Calif. 95126

[22] Filed: Apr. 22, 1976

[21] Appl. No.: 679,164

Related U.S. Application Data

[63] Continuation of Ser. No. 594,858, July 10, 1975, abandoned.

[52] U.S. Cl. .................................. 70/232; 70/212; 70/230

[51] Int. Cl.$^2$ .................... E05B 73/00; F16B 41/00

[58] Field of Search ............ 70/212, 232, 178, 229, 70/230, DIG. 58, 56, 58, 63, 52, 53, 211, 423, 455; 248/203

[56] References Cited

UNITED STATES PATENTS

| | | | |
|---|---|---|---|
| 2,500,375 | 3/1950 | Parker | 70/232 |
| 2,529,432 | 11/1950 | Tenner | 70/232 |
| 3,744,282 | 7/1973 | Hemphill | 70/58 |
| 3,889,500 | 6/1975 | Hix | 70/232 |
| 3,893,312 | 7/1975 | Johnson | 70/232 X |
| 3,910,079 | 10/1975 | Gassaway | 70/232 X |

FOREIGN PATENTS OR APPLICATIONS

| | | | |
|---|---|---|---|
| 1,198,922 | 3/1969 | United Kingdom | 70/232 |

*Primary Examiner*—J. Franklin Foss
*Attorney, Agent, or Firm*—Leslie M. Hansen

[57] ABSTRACT

A locking hardware adapted to conceal and confine the clamp screws of an outboard motor against operative removal from the transom board of a boat and the like by the provision of a back plate set against the transom board by the clamp screws and having a stud bolt parallel to the clamp screws and inboard arm of the C clamp of the motor upon which stud bolt a channel iron cover member is mounted to confine the handles of the clamp screws, the cover member having a cylindrical shell aligned with the threaded end of the stud bolt for receiving a wrench operated nut therein for securing the cover member to the bolt and lock receiving keyway in the wrench head of the nut for locking such nut within the cylindrical shell to prevent removal of the nut therefrom.

8 Claims, 13 Drawing Figures

LOCK HARDWARE FOR OUTBOARD MOTOR

This application is a continuation in part of my application Ser. No. 594,858 filed July 10, 1975, in the U.S. Patent Office and now abandoned.

The invention relates to hardware for locking an outboard motor to the transom of a boat and the like. More particularly, the invention is directed to means for locking the motor mount of an outboard motor against removal from a mounting means sans key or such authorization.

BACKGROUND

As is well known, outboard motors are not a permanent part of a boat and are therefore detachable for use on various types of rented boats or for reasons of lightening and weight of boats during launching and/or trailering thereof. To this end, it is a standard practice to provide each outboard motor with a motor mount in the form of C clamps usually cast integrally with the main body of the outboard motor. Such C clamp motor mount is conventionally an inverted C shape having a bight adapted to fit over a mounting board such as the transom of a boat and the like. One arm of the C shape has a flat face to fit against the transom board and the other arm has a pair of tapped bores for threaded clamp screws movable normal to the flat face and transom board for securing them together.

Each of the clamp screws are provided with handles or crossbars to facilitate tightening and/or loosening of the clamp screws. With an outboard motor thus so easily removable from its mounting board, thefts of such motors have become prevalent.

Numerous ways of preventing theft of outboard motors have included chains and/or cables with padlocks. Such chains and/or cables are easily severed by modern high-powered cutting shears. Various forms of locking devices applied as covers and/or interlocking apparatus for the threaded clamp screws have been devised. Among these known to be patented in the U.S. are: U.S. Pat. No. 2,500,375; Mar. 14, 1950; Parker; U.S. Pat. No. 2,639,605; May 26, 1953; Knutson; U.S. Pat. No. 2,798,369; July 9, 1957; Homan; U.S. Pat. No. 2,984,096; May 16, 1961; Futman; U.S. Pat. No. 3,287,943; Nov. 29, 1966; Vaughn et al.; U.S. Pat No. 2,529,432; Nov. 1950; Tenner; U.S. Pat. No. 3,650,130; Mar. 1972; Thompson; U.S. Pat. No. 3,889,500; June 1975; Hix et al.;

Parker and Homan each show barrel type locks associated with intricate interconnecting plates applied to the threaded clamp screws. Knutson, Futman and Vaughn each show cover plates requiring a padlock which may easily be sheared.

The present invention has its embodiment in a simple yet efficient Lock Hardware structure adapted to cover and enclose the transverse handles of the threaded clamp screws and a detachable mounting plate provided with a long bolt and means on the cover for locking the latter to the long bolt.

It is an object of the present invention to provide a cover for either swivel or transverse handles of C clamp screws to prevent turning thereof and to conceal the screws themselves against severence by hacksaw blades or removal from the cover although thus severed.

These and other objects and advantages of the present invention will appear more fully in the following description and claims when read in the light of the accompanying two sheets of drawing in which:

GENERAL DESCRIPTION

Figure 8:
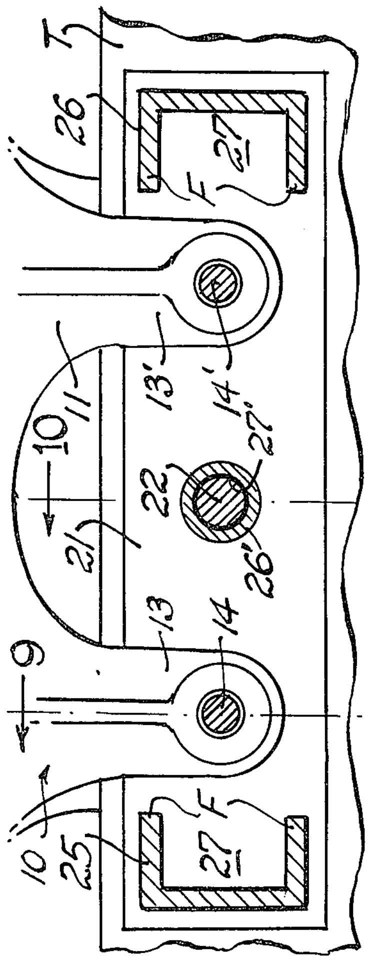
FIG. 8 is a section through FIG. 7 taken along line 8—8 in FIG. 7.
Figure 7:
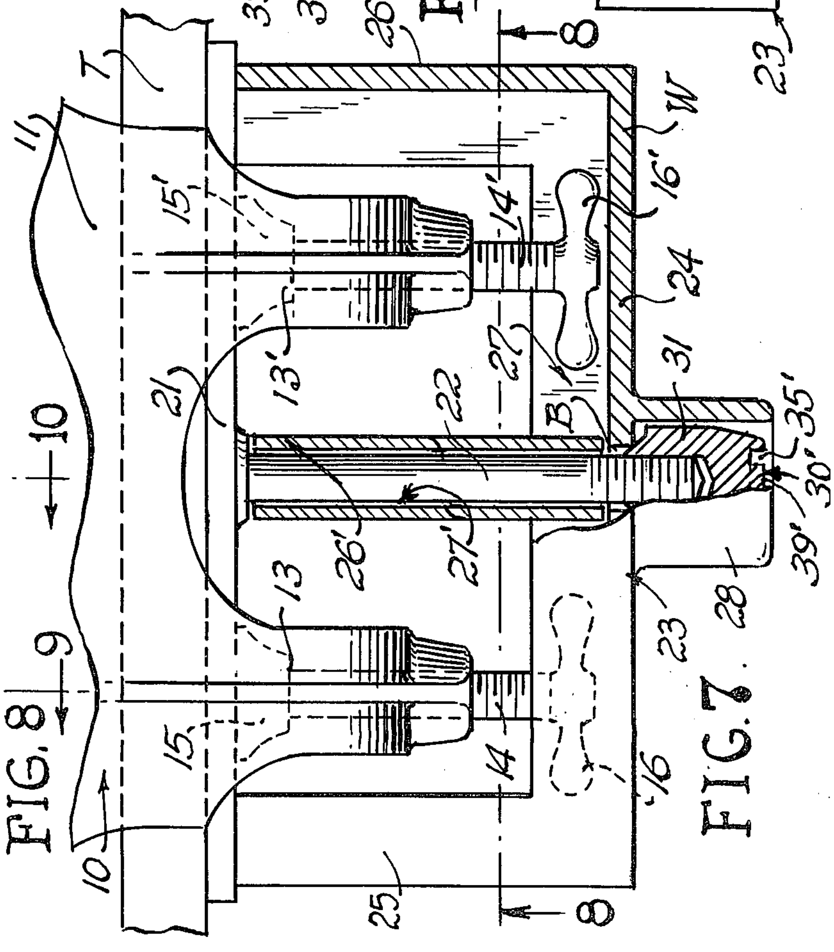
FIG. 7 is a plan view of the example partly broken away to illustrate the tubular sleeve on the single bolt.

In the drawing, an outboard motor 10, shown fragmentarily, has a clamp body 11 formed integrally with the motor housing. The clamp body 11 has a flat face 12 on one arm adapted to rest against a board T such as the transom of a boat V. The bight portion of the clamp body 11 overlies the transom board T and the inboard portion 13 of the clamp is disposed in substantial parallel relation to the flat face 12. It should here be noted that in some outboard motors the inboard portion 13 of the C clamp body 11 is a single arm as in FIG. 1 whereas in others the inboard arm 13 is split or divided into dual arms 13—' as illustrated in FIGS. 7 and 8.

In either case, a pair of clamp screws 14—14' have their threaded shanks mounted in a spaced relation on the inboard arm or arms 13 for threaded movement toward and from the flat face 12. Each screw 14—14' has a padded end 15—15' for engaging the inboard side or face of the transom board T. The opposite or outer ends of the screw shanks 14—14' each have a handle 16—16' thereon for manipulating the screws with sufficient leverage to tighten the C clamps to the transom board T. The handles 16—16' may be fixed as in FIGS. 7 and 9 or headed rods slidably mounted in diametric bores at the free ends of the screw shanks 14—14'. However, they are sometimes swivelly mounted thereon as shown at 17 in FIGS. 1, 2, 3 and 4.

DETAILED DESCRIPTION

In its most simple form, the locking hardware generally designated 20 includes a back plate 21 having at least one stud bolt 22 welded thereto so as to extend perpendicularly therefrom. This back plate 21 is adapted to be secured against the transom board T by the clamp screws of the outboard motor. This sufficies if the outboard motor is to be used on a rented boat.

Figures 1, 2, 3, 4, 5, 6:
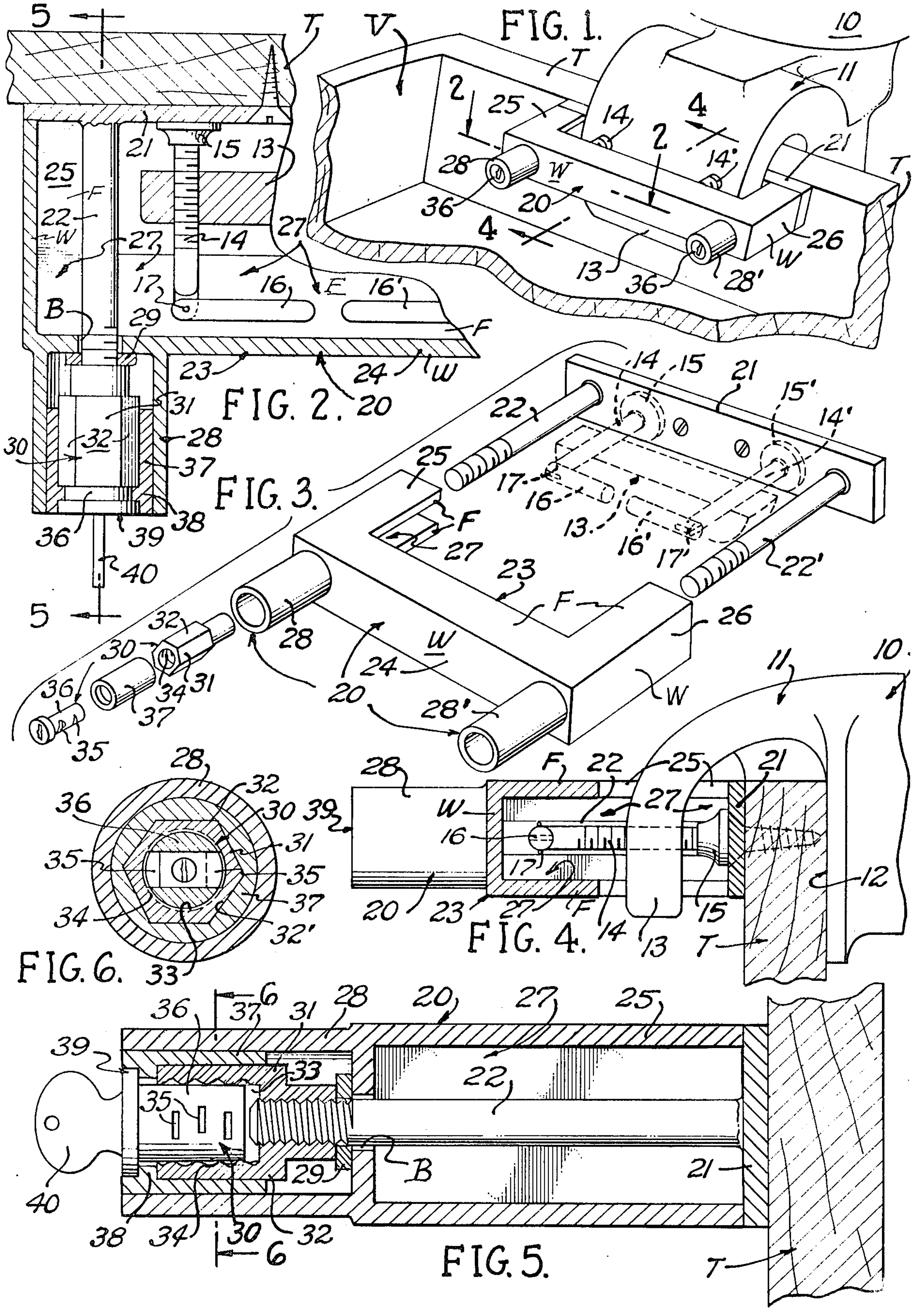
FIG. 1 is a fragmentary perspective view of the stern end of a boat having an outboard motor clamped to the transom and locked by the hardware of the present invention.
FIG. 2 is a fragmentary horizontal section through FIG. 1 taken along line 2—2 therein.
FIG. 3 is an exploded perspective view of the lock hardware embodying the present invention.
FIG. 4 is a vertical section taken through FIG. 1 taken substantially along line 4—4 therein.
FIG. 5 is a vertical section through FIG. 2 taken along line 5—5 therein.
FIG. 6 is a cross section through FIG. 5 taken along line 6—6 therein.

However, in cases where the boat is owned by the person owning the motor the back plate 21 may be permanently secured to the transom board T as shown in FIGS. 2, 3 and 4.

A cover member 23 consisting of channel iron has a main body 24 terminating at its ends in a pair of parallel channel iron legs 25 and 26 spaced from each other to embrace the inboard portion 13 of the C clamp as well as the clamp screws 14—14' extending therefrom. The channel iron legs 25 and 26 are at right angles to the main body 24 and all have their web portion W outwardly disposed and the flanges F extending inwardly to form a C shaped chamber 27.

The channel iron legs 25 and 26 have their free ends disposed to engage and lie flush against the outer corner zones of the back plate 21. The main body 24 of the channel iron cover 23 is spaced from the free ends of the legs 25 and 26 so that the handled ends 16—16' of the clamp screws 14—14' are confined within the web and flanges of the main body 24 of the cover 23.

In accordance with the present invention the cover member 23 is adapted to be secured to the back plate 21 by means of one or more bolt means 22. Each bolt means has one end welded to the inboard face of the back plate 21 so as to extend inwardly parallel to the threaded shanks 14—14' of the clamp screws. The opposite or free end of such bolt 22 is threaded and extends through a bore B formed through the web W of the main body 24 of the cover member 23. The threaded end of the bolt 22 extends partially into a sleeve shell 28 formed integrally upon the inboard face of the web W in axial alignment with bore B and bolt means 22.

In the case of outboard motors having split inboard C clamp portions 13—13' only a single bolt 22 disposed midway the ends of the back plate 21 need be employed. As best seen in FIGS. 7 through 10 the single bolt means 22 extends midway between screw shanks 14 and 14' and into a single sleeve shell 28 centrally located on the inboard face of the web W of the cover 23.

In the case of an outboard motor having a C clamp body 11 in which a single arm 13 would cover the central portion of the back plate 21 as shown in FIGS. 1 and 4, stud bolts 22 and 22' are employed. These stud bolts are identical to that of FIGS. 7, 8 and 10 except that they are welded to the back plate 21 adjacent the extreme ends thereof as best seen in FIG. 3. The stud bolts 22 and 22' are disposed in the same horizontal plane and parallel to the clamp screw shanks 14—14' and embrace the inboard portion 13 of the motor mount.

The threaded ends of the bolts 22 and 22' extend through bores B aligned therewith in the web portion of the main body 24 of the cover 23. They also extend partially into a respective sleeve shell 28 and 28' welded to the inboard face of the web W in alignment with the bores B and stud bolts 22—22'.

In either case (FIGS. 1, 2 and 3 or FIGS. 7 and 9) the stud bolts are adapted to receive a lug nut 31 having internal threading to fit that of the ends of the stud bolts for securing the cover member 23 tightly against the back plate 21.

A conventional key operated lug nut locking arrangement 30 is provided in conjunction with the lug nut 31. Such lug nut locking arrangement as shown in FIGS. 3, 5 and 6 may be in the form of the locking device shown in U.S. Pat. No. 3,782,146. Alternatively, it may be a more simple form of key operated lug nut locking arrangement as depicted at 30' in FIGS. 7, 10, 11, 12 and 13 which is available on the market for locking a lug nut to a lug bolt.

Figure 11:
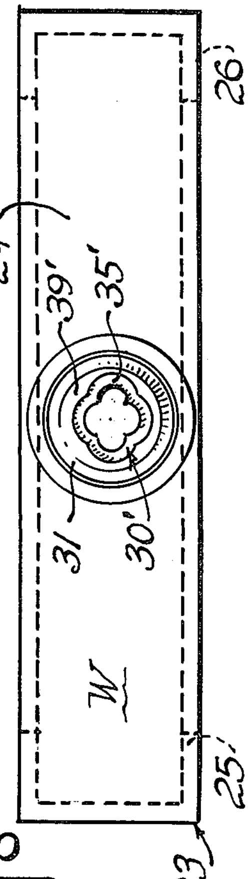
FIG. 11 is a front face view of FIG. 7 to illustate the key receiving recess in the locking bolt.

In the simplified form, the locking arrangement 30' has a coded recess 35' formed in the exposed face 39' of the lug nut 31 (FIG. 11). Key 40' has an embossed end 36' coded to fit the coded recess 35' in the exposed face 39' of the lug nut 31. By this arrangement 30' only a person having a coded key 40' corresponding to the coded recess 35' on the lug nut 31 can release and/or unlock the lug nut from within sleeve shell 28.

In the case of the more complex conventional locking arrangement (FIGS. 2, 3, 5 and 6) the lug nut 31 is of lesser peripheral dimension than the internal diameter of the cylindrical shells 28 and 28' on the cover member 23. Such nut 31 has an integral wrench operated hex head 32 at an enlarged opposite end and an internal bore 33 serrated as at 34 for interlocking relation with coded lock fingers 35 of a barrel type cylindrical lock 36. The arrangement is such that a conventional socket wrench head adapted to fit the head 32 has free sliding fit within the internal diameter of either of the cylindrical shells 28 or 28'. By this arrangement, the cover member 23 is adapted to be tightly secured against the back plate 21 by the use of a socket wrench to tighten the nuts 31. The lug nuts 31 are first secured firmly upon the threaded ends of the stud bolts 22—22' to press against washers 29—29' disposed on the latter between the nuts 31 and the web portion W of the cover member 23.

To lock the lug nuts 31 against removal, each is provided with a lock sleeve 37 formed in accordance with the present invention. For the present disclosure, each lock sleeve 37 has an outer diameter to fit the internal diameter of either shell 28 or 28'. Internally, each lock sleeve 37 has hexagon facades 32' to fit the hex head 32 of the bolt 31. The locking sleeve 37 also has an annular flange 38 between the hex facades 32' and the open end 39 of the sleeve, which open end is annular to receive the outer flanged end of the barrel type cylindrical lock 36.

Each barrel type lock 36 may be of the keyless type or provided with a key 40 as shown. In either case, the coded lock fingers 35 are withdrawn inwardly the barrel during insertion of the latter into the serrated internal bore 33 of the lug nut 31. By a turn of the key 40 or coded lock means, the lock fingers 35 project into the serrations 34 within the lug nut 31 to each the same within the cylindrical shell 28 or 28' as the case may be.

Figure 9:
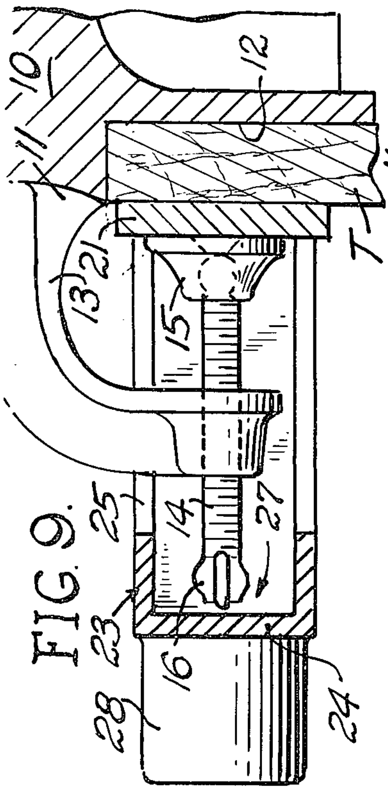
FIG. 9 is a section through one of the clamp wings of FIG. 8 and taken along line 9—9 thereof.
Figure 10:
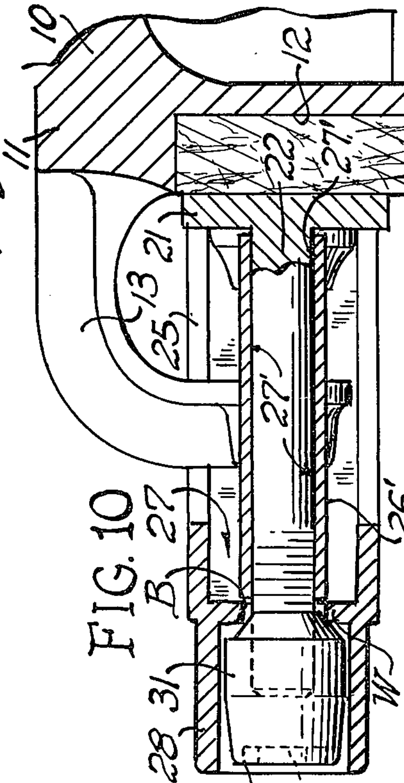
FIG. 10 is a section through FIG. 8 taken along line 10—10 therein to illustrate the single bolt and locking means.
Figure 12:
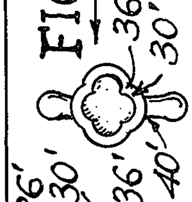
FIG. 12 is a front elevational view of the key which fits the recess in the locking bolt.
Figure 13:
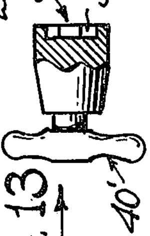
FIG. 13 is a side elevational view of the key of FIG. 12 part of which is shown in section.

From the foregoing, it will be appreciated that the handled ends 16—16' of the clamp screws on the outboard motor are completely confined within the chamber 27 provided by the cover member 23. The dual stud bolts 22 and 22' on the back plate of the locking hardware 20 are likewise confined in the chambers 27 provided by the leg portions 25 and 26 of the channel cover 23. The padded ends of the clamp screws are wholly concealed under the C shaped clamp body 11. Any attempt at cutting that portion of the outer ends of the clamp screws exposed between the inboard arm 13 of the C shaped clamp body and the main body 24 of the cover member 23 would be futile. In FIGS. 7, 9 and 10 the single lug bolt 22 is confined within a chamber 27' extending between the web W of the cover 23 and the back plate 21. The chamber 27' is in the form of a tubular sleeve 26' rollably mounted on the stud bolt 22.

This rollability of the sleeve 26' deters any cutting thereof in an attempt to release the cover 23.

Having thus described the locking hardware for an outboard motor in specific detail, it will be appreciated by those skilled in the art that the structure may be varied, modified and altered without departing from the spirit or scope of my invention therein so called for in the appended claim.

I claim:

1. Locking hardware for the clamp screws on the inboard arm of an outboard motor C clamp which clamp screws have pad ends adapted to press against the transom board of a boat and the like by turning of transverse handles on the opposite ends of such clamp screws; said locking hardware comprising:

1. a back plate adapted to be disposed between the pad ends of such clamp screws and the transom board and secured thereto thereby;
2. a stud bolt mounted on said back plate and extending inboard therefrom parallel to and in the same horizontal plane as the clamp screws:
3. a channel iron cover member having a main body for receiving and confining the handles of the clamp screws within the web and flanges thereof and having a bored hole formed through the web portion of said main body thereof for passage of the threaded end of said stud bolt therethrough;
4. a pair of channel iron legs on the ends of said cover member disposed in the same horizontal plane and parallel to said stud bolt and clamp screws and with the free ends of said legs engaging said back plate;
5. means between the main body of said cover member and said back plate providing a chamber for confining said stud bolt;
6. a cylindrical shell formed on the inboard face of the web portion of the main body of said cover member in axial alignment with the bored hole formed therethrough for receiving and concealing the threaded end of said stud bolt projecting therefrom;
7. a lug nut confinable within said cylindrical shell and threadedly connected to the threaded end of said stud bolt for securing the cover member thereto;
8. a key operated locking means in the free end of said lug nut; and
9. a key adapted to fit the key operated locking means in said lug nut for locking the lug nut within and against removal from said cylindrical shell.

2. The locking hardware in accordance with that of claim 1 including 1. a wrench operated lug nut confinable within said cylindrical shell and having one end threaded for connection to the threaded end of said stud bolt to secure the cover member thereto, said lug nut having a serrated cavity at its opposite end for receiving a barrel type lock;
2. a lock sleeve slidably fit into said cylindrical shell and having an internal cavity provided with facades to fit the wrench operated head of said lug nut; and
3. a barrel lock inserted into the open end of said cylindrical shell and the serrated cavity of said wrench operated lug nut for locking the latter within and against removal from said cylindrical shell.

3. The locking hardware in accordance with that of claim 2 including means for securing said back plate to the inboard side of the transom board.

4. The locking hardware in accordance with that of claim 1 including a pair of stud bolts mounted on said back plate for embracing the clamp screws and the inboard arm of the outboard motor C clamp therebetween and in which said channel iron cover has a bored hole formed through the web portion of its main body in alignment with and for receiving the thread end of a respective one of said stud bolts, and a cylindrical shell formed on the inboard face of the web portion of the main body of said cover member in axial alignment with each of said stud bolts for concealing the thread end thereof as well as one of said key operated lugs nuts threadedly connected to the threaded end of a respective one of said stud bolts.

5. The locking hardware in accordance with that of claim 4 in which said means between the main body of said cover member and said back plate providing a chamber for confining each of said stud bolts comprises the inwardly extending flanges and web portion of an adjacent one of said pair of channel iron legs on the ends of said cover member for embracing the respective stud bolt therebetween.

6. The locking hardware in accordance with that of claim 5 in which said channel iron cover member and channel iron legs are integral and each have their flanges facing inwardly to provide a C shaped chamber for confining and concealing the handles on the screw clamps as well as the stud bolts on said back plate.

7. The locking hardware in accordance with that of claim 6 including 1. a wrench operated lug nut confinable within each of said cylindrical shells and each having one end threaded for connection to the threaded ends of said stud bolts to secure the cover member thereto and each having a serrated cavity at their opposite ends for receiving a barrel type lock;
2. a lock sleeve slidably fit into each of said cylindrical shells and each having an internal cavity provided with facades to fit the wrench operated head of said lug nuts; and
3. a barrel lock inserted into the open end of said cylindrical shells and the serrated cavity of said wrench operated lug nuts for locking the latter within and against removal from said cylindrical shells.

8. The locking hardware in accordance with that of claim 7 including means for securing said back plate to the inboard side of the transom board.

* * * * *